United States Patent
Yohn et al.

(10) Patent No.: US 10,703,099 B1
(45) Date of Patent: Jul. 7, 2020

(54) METHOD AND DEVICE FOR ENABLING A PATTERN TO BE MARKED ON A SUBSTRATE

(71) Applicant: Markem-Imaje Corporation, Keene, NH (US)

(72) Inventors: Andrew Yohn, Keene, NH (US); Mikael Palmén, Lidome (SE)

(73) Assignee: Markem-Imaje Corporation, Keene, NH (US)

( * ) Notice: Subject to any disclaimer, the term of this patent is extended or adjusted under 35 U.S.C. 154(b) by 0 days.

(21) Appl. No.: 16/220,282

(22) Filed: Dec. 14, 2018

(51) Int. Cl.
 *B41J 2/04* (2006.01)
 *B41J 2/075* (2006.01)
 *B41J 3/407* (2006.01)

(52) U.S. Cl.
 CPC .......... *B41J 2/075* (2013.01); *B41J 2/04* (2013.01); *B41J 3/407* (2013.01)

(58) Field of Classification Search
 None
 See application file for complete search history.

(56) References Cited

U.S. PATENT DOCUMENTS

| | | | |
|---|---|---|---|
| 2007/0094162 A1 | 4/2007 | Aragones et al. | |
| 2018/0196349 A1 | 7/2018 | Liu et al. | |

OTHER PUBLICATIONS

Dobrea et al "Genetic Algorithm for Textile Pattern Recognition" ATC'06—34th Aachen Textile Conference, Nov. 29-30, 2007. (Year: 2007).*
Poslesnik et al, "Comparison of Heuristic Algorithms for Path Planning in 3D Printing with Multistage Experimentation System", © Springer Nature Switzerland AG 2019 N. T. Nguyen et al. (Eds.): ICCCI 2019, LNAI 11683, pp. 498-510, 2019 (Year: 2019).*
Wang, D et al "Research on Laser Marking Speed Optimization by Using Genetic Algorithm"; Research Article [Online]. May 8, 2015 [retrieved Feb. 4, 2020]. Retrieved from the internet<URL:https://www.ncbi.nlm.nih.gov/pmc/articles/PMC4425409/pdf/pone.O 126141.pdf>.
International Search Report including Written Opinion for PCT/US19/65897 dated Mar. 2, 2020.

* cited by examiner

*Primary Examiner* — Huan H Tran
(74) *Attorney, Agent, or Firm* — Lerner, David, Littenberg, Krumholz & Mentlik, LLP (57) ABSTRACT

A method for enabling marking of a pattern on a substrate with an industrial printer includes executing a genetic algorithm based on the pattern to be marked on the substrate. A result of the genetic algorithm indicates a resulting path which the industrial printer should follow when marking the pattern on the substrate. It is determined if the resulting path fulfills at least one criterion of: the resulting path matches an optimal path for marking the pattern, the resulting path substantially matches the optimal path, or a time spent for executing the genetic algorithm has reached or exceeded a threshold.

19 Claims, 7 Drawing Sheets

METHOD AND DEVICE FOR ENABLING A PATTERN TO BE MARKED ON A SUBSTRATE

TECHNICAL FIELD

Embodiments herein relate generally to a controller and a method performed by the controller. More particularly the embodiments herein relate to enabling a pattern to be marked on a substrate with an industrial printer.

BACKGROUND

In an industrial printer system, an industrial printer is typically configured to mark various types of substrates with different types of patterns. One example of an operation of such an industrial printer is the marking of patterns on various types of packages or consumer goods e.g. on a packaging line or a manufacturing assembly line. The industrial printer system may also be referred to as an industrial marking system which is configured to mark a pattern on the substrate.

The pattern marked on the substrate may be for example text, graphics, codes, images etc.

The term industrial in industrial printer, industrial printer system and industrial printing may refer to that it is related to or characterized by industry, that it is designed or suitable for use in industry. Industry may be described as the process of making products by using machinery and factories. In industry, the environmental conditions may be variable in time, the ambient temperatures may vary etc.

When marking a pattern such as e.g. a text on a substrate using an industrial printer, the font which describes the way to mark the characters or glyphs in the text is designed by hand. This is a time consuming and inefficient way of designing the font.

When marking the pattern with e.g. a laser printer, the printer may pass the same point on the object several times. When the same point is passed numerous times, there is a large risk for that the laser beam burns through the substrate e.g. in case the substrate is a plastic sheet.

In order for an ink jet printer to determine the order and angle it will fire the ink drops, it considers several inputs such as e.g. the font, the content structure, the speed of the substrate being marked on. In addition, the ink jet printer uses a hand-optimized look-up table containing the patterns of pixels that should be marked and the best way to mark those patterns. Creating and using a hand-optimized look-up table is inefficient and time consuming.

When marking a substrate with a pattern, it is desirable and advantageous for the industrial printer to perform the marking in an optimal or near optimal path. For finding an optimal or a near optimal path for a laser type of industrial printer to mark a substrate with a pattern, the brute force method may be used, i.e. by checking all possible marking paths. Such method for finding the optimal or near optimal marking path takes a very long time to execute since there are a large number of possible marking paths.

In an ink jet printer, there may be a problem that ink droplets influence each other. The firing of the ink droplets is optimized in order to avoid this, but this optimization is today performed manually by a human operator which takes a lot of time.

An unoptimized or poorly optimized font will cause an increase in mirror movement of an laser type of industrial printer, difficult speed or direction changes, all of which increase the print time and decrease the throughput, or retrace areas already marked, which could result in poor print quality such as e.g. burns on the substrate in the case of a laser industrial printer.

Therefore, there is a need to at least mitigate or solve these issues.

SUMMARY

An objective of embodiments herein is therefore to obviate at least one of the above disadvantages and to provide improved marking of a pattern on a substrate.

According to a first aspect, the object is achieved by a method for enabling marking of a pattern on a substrate with an industrial printer. A genetic algorithm is executed based on the pattern to be marked on the substrate. A result of the genetic algorithm indicates a resulting path which the industrial printer should follow when marking the pattern on the substrate. It is determined if the resulting path fulfils at least one criterion.

According to a second aspect, the object is achieved by a controller device being configured to execute a genetic algorithm based on a pattern to be marked on a substrate with an industrial printer. A result of the genetic algorithm indicates a path which the industrial printer should follow when marking the pattern. The controller device is configured to determine if the resulting path fulfils at least one criterion.

Since the genetic algorithm analyses the pattern to be marked on the substrate and results in an at least near optimal path which the industrial printer should follow when marking the substrate with the pattern, the marking of the pattern on the substrate is improved.

Embodiments herein afford many advantages, of which a non-exhaustive list of examples follows:

One advantage of the embodiments herein is that an optimal or near optimal marking with respect to time, speed and quality is possible for substantially any type of marking font, code, image, logo, graphics or combination thereof. No upfront hand optimization is required with the embodiments herein.

An advantage of the embodiments herein is that execution of the genetic algorithm allows user of the printers to use any font they want.

A further advantage of the embodiments herein is that for a laser printer, they reduce the risk for the laser to burn through the substrate when marking. This is due to that the genetic algorithm provides a resulting path which does not pass the same point more than one time or which passes the same point in a minimum number of times.

Another advantage of the embodiments herein is that they allow the current hand-optimized look-up tables and potentially other parts of this process to be replaced by the genetic algorithm. Given conditions such as content structure, what needs to be printed, quality of the mark etc., in addition to a sufficiently accurate model, the genetic algorithm is able to determine an at least near optimal way to print the information.

The embodiments herein provides an advantage of allowing re-ordering the instructions of the current unoptimized or poorly optimized font in a more ideal way for laser marking.

Another advantage of the embodiments herein is that, for an ink jet printer, the genetic algorithm can minimize dot misplacement issues, particularly for marks which cannot be hand optimized in advanced like a Quick Response (QR) code.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
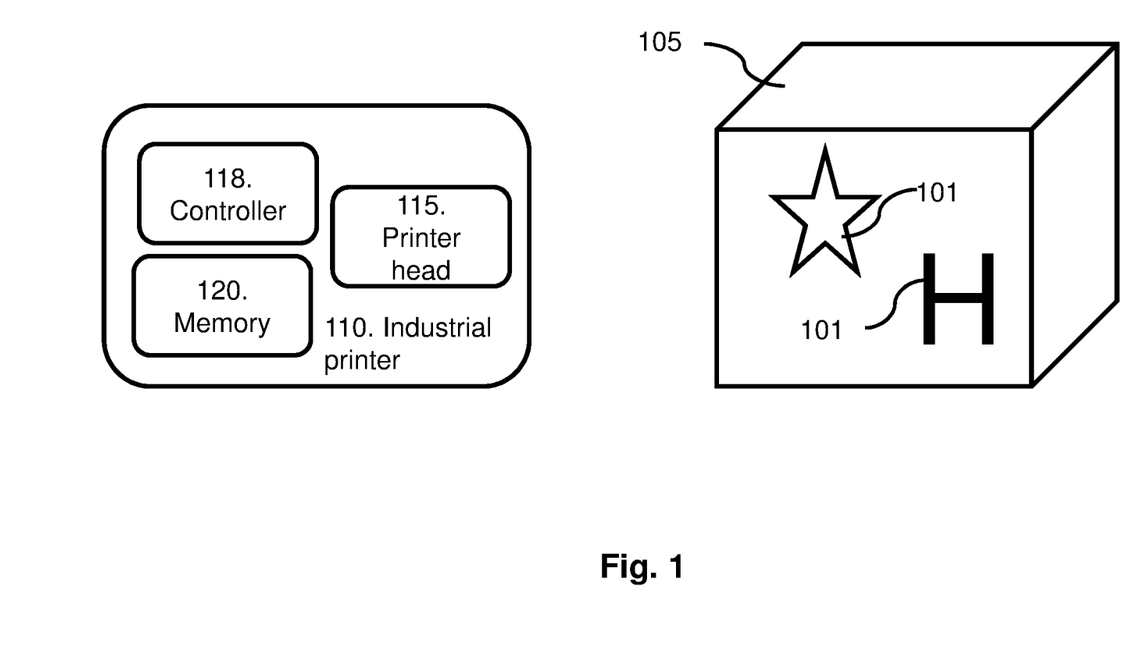
FIG. 1 is a schematic block diagram illustrating embodiments of an industrial printer system.

FIG. 1 illustrates an example of an industrial printer system for marking a pattern 101 on a substrate. The substrate may be comprised in an object 105, e.g. it may be the surface of the object 105, the material of the object 105, etc. The industrial printer system illustrated in FIG. 1 comprises an industrial printer 110 which is configured to mark the pattern 101 on the substrate. Thus, the substrate is marked with the pattern 101 using the industrial printer 110. The pattern may also be referred to as a mark. The procedure of marking the substrate with a pattern may also be referred to as applying a pattern 101, printing a pattern 101, providing a pattern 101, etc.

The object 105 may be referred to as a product, a packaging, a goods etc., i.e. it is an entity adapted to have a pattern 101 marked on it using an industrial printer 110.

The industrial printer 110, e.g. a laser printer or an inkjet printer, may comprise at least one print head 115. Thus, the industrial printer 110 may comprise one, two or multiple print heads 115, but only one is illustrated in FIG. 1 for the sake of simplicity. The print head 115 may be described as an element within the industrial printer 110 that marks the pattern 101 on the substrate. The marking may be performed for example by propelling droplets of ink, writing with a laser beam etc. For example, if the industrial printer 110 is an inkjet printer the print head 115 comprises nozzles (also referred to as jets). The nozzles propel or fire drops/droplets of ink on the substrate which forms the pattern 101. A Continuous Ink Jet (CIJ) is an example of an ink jet printer where a continuous stream of ink drops are fired from the print head 115 onto the substrate when marking the pattern 101. In another example, the industrial printer 110 may be a laser printer. In a laser printer, a laser beam enables the marking of the pattern 101 on the substrate. Note that the CIJ printer is used herein as an example only, and other types of ink jet printers is equally applicable since they also have a problem with firing the dots and how they influence each other.

The industrial printer 110 may further comprise a controller 118 and a memory 120. The controller 118 may be adapted to communicate, wirelessly or via wire, with the print head 115 for example by sending instructions for marking the pattern 101 on the substrate. The controller 118 may be arranged to create the pattern 101, to control the print head 115, etc. The controller 118 may be a standalone device which is arranged to communicate with the industrial printer 110, or the controller 118 may be embedded in the industrial printer 110, as exemplified in FIG. 1.

The controller 118 and the memory 120 may be located at the same physical location as the print head 115, or they may be located at locations. The controller 118 and the memory 120 may be located in one enclosure, box or frame, and the print head 115 may be located in another enclosure, box or frame, both located at the same or different physical locations but adapted to be connected to and communicate with each other.

The memory 120 may be adapted to store e.g. the pattern 101 to be marked, instructions received form the controller 118, printer settings etc. The memory 120 may be co-located with the controller 118 in the industrial printer 110, or the memory 120 may be a remote memory which is remote to the controller 118 and which the controller 118 may be adapted to communicate with. The memory 120 may be located at the same physical location as the controller 118 or it may be located in a different location, e.g. it may be a cloud memory.

The industrial printer 110 may further comprise an input unit and an output unit (not shown in FIG. 1). The input unit may be adapted to receive input from for example a user or an operator of the industrial printer 110. The received input may be for example user configured printer settings, selection of one of a plurality of candidate patterns 101 to be marked on the substrate etc. The output unit may be adapted to provide candidate patterns 101 to the user for his selection, to provide confirmation of a marked pattern 101 to the user etc. The input unit and the output units may be separate units or they may be co-located.

The components of the industrial printer 110 may be located at the same physical location, or they may be located at different locations. The print head 115 is located at the same location as the object 105, but the other components of the industrial printer 110, i.e. the controller 118, the memory 120, the input and output units may be located at the same or different location as the print head 115 and the object 105. For example, if the controller 118 is located at a different location than the print head 115 and the object 105, the controller 118 may be adapted to wirelessly communicate with the print head 115 in order for it to mark the pattern 101 on the substrate.

The industrial printer system may for example be in use with a packaging or product line (not illustrated in FIG. 1) which moves the object 105 having the substrate past the industrial printer 110, e.g. past the print head 115. The industrial printer 110 may mark the pattern 101, using the print head 115, on the substrate while the object 105 moves past the industrial printer 101, e.g. while the object 105 moves past the print head 115. The packaging or product line may comprise a conveyor belt on which the object 105 is located, and the conveyor belt moves in with a conveyor speed.

The substrate on which the pattern 101 is to be marked may be located in a certain distance with respect to the print head 115. The distance may be fixed or adjustable.

The industrial printer 110 may be a black and white printer or a color printer. Thus, the pattern 101 may comprise one, two or more colors. The pattern 101 may form text, graphics, codes, marks, images etc. such as e.g. a company logo, a trademark, a product name, a bar code, an expiry date, 1D barcodes, 2D barcodes, lines, boxes, etc.

The method for enabling marking of a pattern 101 on a substrate with an industrial printer 110 according to some embodiments will now be described with reference to the flowchart depicted in FIG. 2a and FIG. 2b. The method may be seen as being performed by an industrial printer 110, for example by the controller 118 associated with or comprised within the industrial printer 110. The method comprises at least one of the following steps, which steps may as well be carried out in another suitable order than described below:

Step 200

This may be an optional step. An initial setup of a genetic algorithm may be performed. For example, this step may be performed before the algorithm is executed for the first time. There may not be any need for an initial setup of the algorithm for the second or more times which the algorithm is executed. The initial setup may involve registering configuration data of the industrial printer 101 which may be necessary in the marking process, uploading the pattern 101 etc.

Step 201

The genetic algorithm is executed based on the pattern 101 to be marked on the substrate. A result of the genetic algorithm indicates a path which the industrial printer 110, e.g. the print head 115, should follow when marking the pattern 101. The resulting path may be referred to as an optimal path, a near optimal path, a substantially optimal path, an almost optimal path, an approximation of the optimal path, an estimation of the optimal path etc., and may be described as a path which is as close to the optimal path as possible to be obtained with execution of the genetic algorithm.

The input to the genetic algorithm may be described as the pattern 101 to be marked such as for example codes or images. The input may in addition be constraints, e.g. the conveyor speed, or a range minimum and maximum conveyor speed etc. The input may be provided to the genetic algorithm for example via a job or image description, printer configuration, sensor input etc. The output of the genetic algorithm may be described as parameter values and sequence and direction of firing the drops of the marking.

A Genetic Algorithm (GA), has a great ability to search a through a huge combination of parameters to find the best possible match with the optimal parameter. Generally, a genetic algorithm may be described is a method for solving optimization problems based on a natural selection process that is inspired by the biological evolution. The algorithm repeatedly modifies a population of individual solutions. At each step, the genetic algorithm randomly selects individuals from the current population and uses them as parents to produce the children for the next generation. Over successive generations, the population "evolves" toward a solution which is as near the optimal solution as possible, preferably the exact same as the optimal solution. Using other words, in each generation, the fitness of every individual in the population is evaluated, multiple individuals are selected from the current population and based on their fitness, and modified, e.g. recombined and possibly mutated, to form a new population. The new population is then used in the next iteration of the algorithm. The algorithm terminates when either a maximum number of generations has been produced, or a satisfactory fitness level has been reached for the population.

Thus, a genetic algorithm may be divided into the following two parts:

1) A genetic representation of the solution domain:
2) A fitness function used to evaluate the solution domain.

The solution domain mentioned above corresponds to the pattern to be printed, e.g. the letters A or H.

When a fitness function is applied, it provides an indication of how close a solution is to the desired or optimal solution, i.e. an indication of a near optimal solution. The fitness function is defined over the genetic representation and measures the quality of the represented solution, a figure of merit. For example, a fitness function indicates how close a path for marking the pattern 101 is to an optimal path.

The result of the genetic algorithm is the path which the industrial printer 110, e.g. the print head 115, should follow when marking the substrate with the pattern 101. The resulting path may be described as an optimal or a near optimal path which the industrial printer 110 should follow. The near optimal path may also be referred to as an approximately optimal path. In more detail, the resulting path indicates at least one of the following:

- For a laser and an ink jet printer: An order in which parts which constitutes the pattern 101 should be marked by the industrial printer 110 when marking strokes and performing jumps when marking the substrate in the path, and/or
- For a laser printer: A direction in which the parts which constitutes the pattern 101 should be marked with the industrial printer 110, and/or
- For an ink jet printer: A deflection angle.

The deflection angel mentioned above is controlled by drop charge and deflection plate charge.

The above is a non-exhaustive list of examples of what the resulting optimal or near optimal path may indicate. And other examples may be stroke length, jump length, total path length, dwell time, pixel spacing etc. The resulting optimal or near optimal path may be different for an industrial printer 110 based on laser technology compared to an industrial printer 110 based on ink jet technology. For example, for an ink jet printer 110, the resulting optimal or near optimal path may indicate the order in which parts which constitute the pattern 101 should be marked and the deflection angle. For a laser printer 110, the resulting optimal or near optimal path may indicate the order and the direction in which the parts should be marked.

The term deflection angle mentioned above will now be shortly described. A drop charge results in a deflection angle and a deflection distance. The drop charge and deflection plate charge controls the deflection angle.

For example, the resulting optimal or near optimal path may indicate the order and direction of the strokes for the vector fonts and the order of firing of the drops in the pattern 101.

The parts which constitute the pattern 101 may be at least one of: strokes and/or jumps and/or dots. The term "at least one" used herein refers to one, two or more. Thus, there may be at least three different types of parts which may constitute the pattern 101, and any number, order and combination of these parts is applicable. A pattern 101 to be marked by an ink jet printer may be constituted of dots. A pattern marked by an ink jet printer does not comprise skips, jumps and mirrors. A pattern 101 to be marked by a laser printer may be constituted by strokes and/or jumps. The pattern parts, when constituting a certain pattern, will be marked in an ordered sequence. Using other words, a pattern 101 may comprise an ordered sequence of strokes and/or dots, and possibly also jumps if required.

Using an example where the pattern 101 to be marked is the letter H. The resulting optimal or near optimal path may then indicate in which order the industrial printer 110 should mark strokes and perform jumps when marking the letter H.

The direction in which the laser beam or the deflection of the ink droplets moves when marking the pattern 101 may be at least one of left, right, up and/or down. For example, a laser beam may be moved in any suitable combination of x and y coordinates, e.g. to make a curved stroke. The ink jet printer may only move in one axis, which may be referred to as up/down. The laser may move in both axes.

The pattern 101 to be marked may be a text, a graphic, a one or two dimensional code, an image, lines, a box or a circle. For example, true type fonts or proprietary font formats may be used to describe how to mark glyphs in the text.

At start of step 201 or at the first time the genetic algorithm is started, a timer may be started. The timer is to be used in step 202 for keeping track of the time spent for executing the genetic algorithm.

Step 202

Step 202 involves determining whether the resulting path from step 201 fulfils or come sufficiently close to at least one criterion. The resulting path may be an optimal or a near optimal path. This may also be described as applying a fitness function to the resulting path from step 201. The fitness function evaluates and compares the results of each iteration of the genetic algorithm to evaluate which results are a better match to the optimal path and pick the "genes" to use in the next genetic iteration or if the condition has been met and the results can be used to start marking.

This step 202 may be seen as a part of the genetic algorithm or as a separate method step.

The at least one criterion may be at least one of the following:

Criterion 1: that the resulting path matches an optimal path for marking the pattern 101, i.e. that the resulting path is an optimal path; and/or Criterion 2: that the resulting path substantially matches the optimal path, i.e. that the resulting path is a near optimal path; and/or Criterion 3: that a time spent for executing the genetic algorithm has reached or exceeded a threshold, i.e. the time for performing step 201.

Substantially matching may refer to that the resulting path may be the same as the optimal path with or without a tolerance, i.e. that the resulting path is close enough to the optimal path. The tolerance may be predetermined by the operator of the printer 110 or it may be determined by the printer 110 itself. The threshold for the time spent for executing the genetic algorithm may be predetermined by the operator of the printer 110 or it may be determined by the printer 110 itself.

The criteria may have different priority. For example, criterion 1 may have higher priority than criteria 2 and 3. In another example, criterion 3 may have higher priority than criteria 1 and 2. So, when the criterion with the highest priority is fulfilled, the method proceeds to step 203.

Below is an example of some combinations of the criteria that may be used:

Criterion 1
Criterion 1 and criterion 2
Criterion 1 and criterion 3
Criterion 2 and criterion 3
Criterion 1, criterion 2 and criterion 3

Figure 2A:
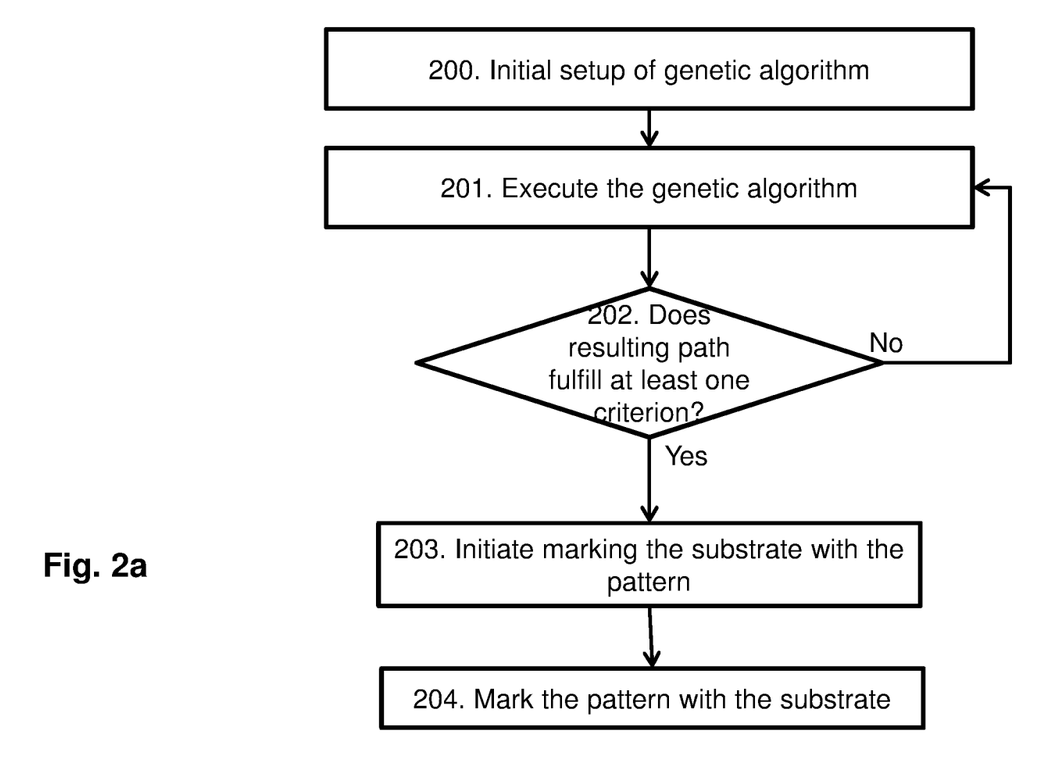
FIG. 2a is a flow chart illustrating embodiments of a method.
Figure 2B:
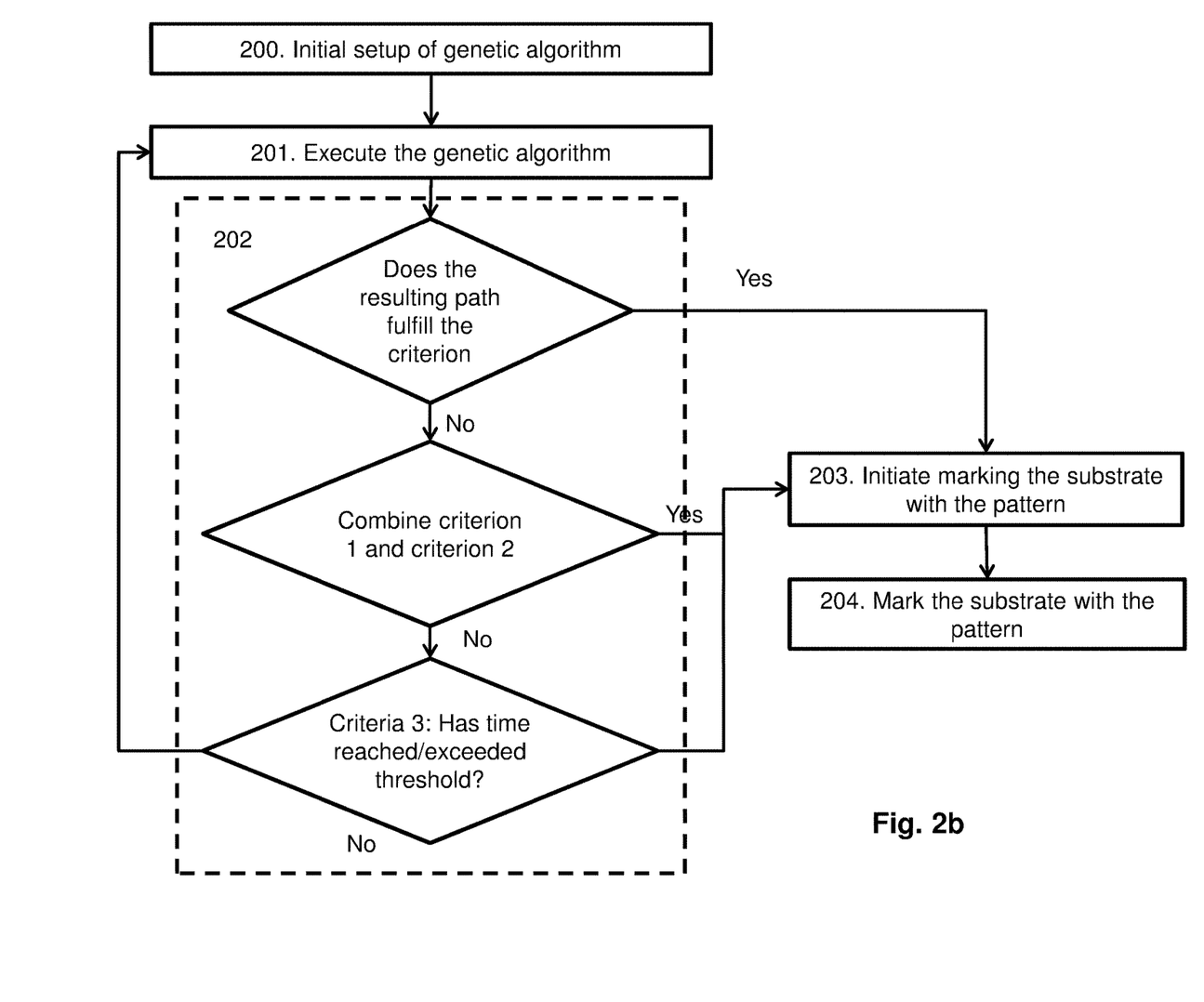
FIG. 2b is a flow chart illustrating embodiments of a method.

An example where all criteria 1, 2 and 3 are used is seen in FIG. 2b. If criterion 1) is fulfilled, then the method proceeds to step 203. If criterion 1) is not fulfilled, then criterion 2) is checked. If criterion 2) is fulfilled, then the method proceeds to step 203. If criterion 2) is not fulfilled, then criterion 3) is checked. If criterion 3) is fulfilled, then the method proceeds to step 203. If criterion 3) is not fulfilled, then the method goes back to step 201.

For example, for a laser printer, the print head 115 may move the laser beam when it marks the substrate with the pattern 101, and moving takes time. Therefore, the resulting optimal or near optimal path may have at least one of: a minimal jump distance and/or a minimal number of mirror direction reversals and/or a minimal number of mirror speed changes, and/or a minimum of retracing of an area that already has been marked etc. At least one of these is to be performed by the industrial printer 110 when marking the pattern 101 in the resulting path using as little time as necessary for the marking, where the resulting path is an optimal path or a near optimal path. This may also be different in ink jet printers and laser printers. For example, an ink jet printer does not have skips, jumps and mirrors.

For example, in an ink jet printer, drops of ink may influence each other and may also consequently collide when they are fired towards the object 105 when marking. In such example, the optimal or near optimal path has a minimum of such ink drop influence given other parameters such as the ink type and print speed. E.g. it might not be possible to select the marking path with the minimum drop influence as this might not reach the print speed target. The optimal is when it has the least amount of deviations in the dot placement, i.e. the most correct dot placement. In current printers, this is calculated manually which is very time consuming. With use of the genetic algorithm, this time is drastically reduced compared to the manual calculation.

Step 202a (not Illustrated in FIG. 2a)

This is an optional step. This step is a substep of step 202. It may be determined that the execution of the genetic algorithm should be iterated if the resulting path does not fulfill at least one of the criterion.

Step 202b (not Illustrated in FIG. 2a)

This is an optional step. This is a substep of step 202, and a step to be performed after step 202a. At least a part of the resulting path may be selected based on at least one parameter, where the resulting path is an optimal path or a near optimal path.

The parameter to be used when selecting at least part of the resulting path may be associated with at least one of:

A size of the pattern 101, and/or

A conveyor speed or a range of conveyor speed of a packaging line on which the object 105 is conveyed when the pattern 101 is marked, and/or A distance from a print head 115 of the industrial printer 110 to the substrate, and/or An ink type to be used by the industrial printer 110 when marking the pattern 101 using the print head 115.

As mentioned above, the speed of packaging line may be part of the fitness function, see above. Fitness evaluation may be done against e.g. speed of packaging line. The speed can be a range of min-max speed.

Step 202c (not Illustrated in FIG. 2a)

This is an optional step. This is a substep of step 202 and step to be performed after step 202b or after step 202a. Execution of the genetic algorithm may be iterated as determined in step 202b. The selected part from step 202b may be re-used when iterating the genetic algorithm. The genetic algorithm may be iterated one, two or more times until it fulfils the criterion.

Step 203

Marking of the pattern 101 on the object 105 in the resulting path may be initiated. This may be in the form of that the controller 118 sends an instruction to the printer 110 to mark the pattern 101 with the print head 115. It may be an internal or external event which initiates the printing. Initiating the printing may also be referred to as triggering the printing. Initiating of the printing is done when the resulting path is an optimal path or a near optimal path.

Step 204

The printer 110 may mark the pattern 101 on the substrate in the resulting path.

Some example of marking a pattern 101 will now be described with reference to FIGS. 3a, 3b, 4a, 4b and 4c. The continuous arrows in these figs. represent strokes and the dotted arrows represent jumps. A stroke may also be referred to as a printing stroke or a draw and is, for a laser printer, a movement of the laser beam from one point to another where the path between the points are marked when marking the pattern 101. An ink jet printer fires ink droplets, which consequently acts differently than a laser printer.

The black dot in the figs. represents the starting point for the marking.

Figure 3A:
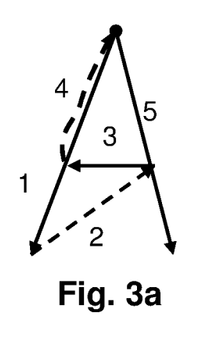
FIG. 3a is an example of marking the pattern A in a non-optimal path.
Figure 3B:
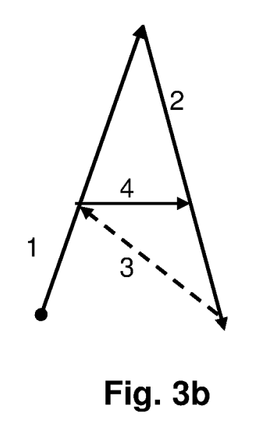
FIG. 3b is an example of marking the pattern A in an optimal or near optimal path.

FIG. 3a and FIG. 3b illustrate marking of the pattern 101 being exemplified with the letter A, where FIG. 3a illustrates marking the pattern A in a non-optimal path and FIG. 3b illustrates marking the A in an optimal or near optimal path. Non-optimal refers to marking using prior art methods, i.e. not using the genetic algorithm. FIG. 3b illustrates printing the pattern A in an optimal or near optimal path using the method with the genetic algorithm described herein. FIG. 3a illustrates a long jump distance and FIG. 3b illustrates a short jump distance, where the jump distance in FIG. 3b is shorter than the one illustrated in FIG. 3a.

As seen in FIG. 3a, the marking starts in the top of the A, and then the marking is performed according to the numbered arrows in increasing order, starting with stroke 1, jump 2, stroke 3, jump 4 and ending with stroke 5. Thus, this non-optimal path comprises 5 steps, i.e. 3 strokes and two jumps.

Now proceeding to the optimal or near optimal path in FIG. 3b. In FIG. 3b, the marking starts in the left bottom of the A which is a different starting point than in the non-optimal path in FIG. 3a. The marking in FIG. 3b is also performed according to the numbered arrows in increasing order, starting with stroke 1, stroke 2, jump 3 and ending with stroke 4. Thus, this optimal or near optimal path comprises four steps, i.e. 3 strokes and 1 jump. Jump distance in FIG. 3a comprises jump 2 plus jump 4, which is a longer total jump distance for the whole pattern 101 compared to FIG. 4b which only comprises jump 3 in total. The pattern marking in FIG. 3b has a shorter jump distance compared to FIG. 3a. A shorter jump distance has the advantage of taking less time and allows for throughput to increase.

Figure 4A:
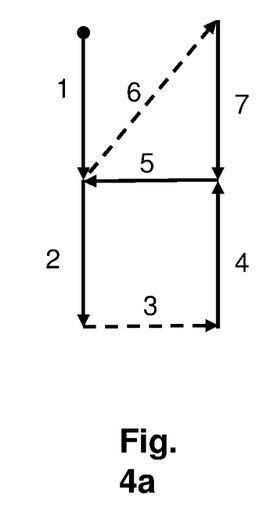
FIG. 4a is an example of marking the pattern H in a non-optimal path.
Figure 4B:
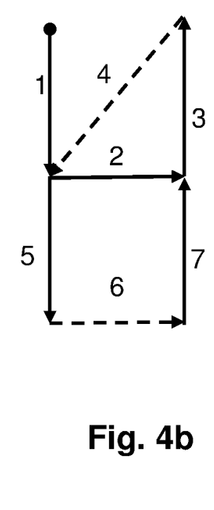
FIG. 4b is an example of marking the pattern H in an optimal or near optimal path.
Figure 4C:
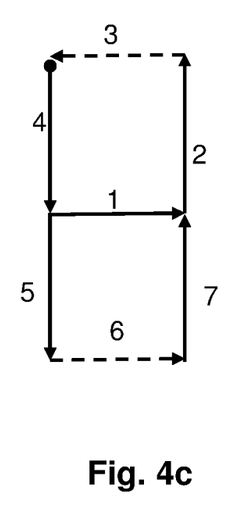
FIG. 4c is an example of marking the pattern H in an optimal or near optimal path.

FIG. 4a, FIG. 4b and FIG. 4c illustrate marking of the pattern 101 being exemplified by the letter H, where FIG. 4a illustrates marking the pattern H in a non-optimal path. Non-optimal refers to marking using prior art methods, i.e. not using any genetic algorithm. FIG. 4b and FIG. 4c illustrate two examples of marking the pattern H in an optimal or near optimal path using the method with the genetic algorithm described above. FIG. 4b may also described as showing the evolution of the optimization with the algorithm, where FIG. 4a is the starting point, FIG. 4b is the result after some iterations which is better than shown in FIG. 4a, and FIG. 4c is the optimal/near optimal path.

As seen in FIG. 4a, the non-optimal marking of letter H starts in the black start dot or circle in the upper left corner which may also be referred to as a start point or as the point (0,0) in an x-y coordinate system (illustrated in FIGS. 4a, 4b and 4c). The marking is performed starting at the start point and is then continued according to the numbered arrows in increasing order, starting with stroke 1, stroke 2, jump 3, stroke 4, stroke 5, jump 6, and ending with stroke 7. The non-optimal marking of H is performed in 7 steps, i.e. 5 strokes and 2 jumps. An overview of the seven marking steps in FIG. 4a is shown in Table 1 below where the right column represents the steps 1-7, the middle column represents the start point of each marking step, i.e. a movement in the x direction, and the right most column represents the end point of each marking step, i.e. a movement in the y direction. y refers to a point on the y-axis, and x refers to a point on the x-axis. The −y refers to a downwards movement on the y-axis, +y refers to an upwards movement on the y-axis, −x refers to a left movement on the x-axis and +y refers to a right movement on the x-axis. 0 in the table refers to that there is no movement in the particular axis. The bold x and y in Table 1 illustrates a direction change, which will be described in more detail later.

TABLE 1

| Marking step | x direction | y direction |
| --- | --- | --- |
| 1 | 0 | −y |
| 2 | 0 | −y |
| 3 | +x | 0 |
| 4 | 0 | +y |
| 5 | −x | 0 |
| 6 | +x | +y |
| 7 | 0 | −y |

Now moving to FIG. 4b which illustrates one example of the optimal or near optimal marking of the pattern 101 being exemplified by the letter H. This optimal or near optimal marking also starts in the upper left corner of the letter H, which is the same start point as in FIG. 4a. The marking then continues according to the numbered arrows in increasing order, starting with stroke 1, stroke 2, stroke 3, jump 4, stroke 5, jump 6 and ending with stroke 7. The optimized marking in FIG. 4b is performed in 7 steps, i.e. 5 strokes and 2 jumps, which is the same as in FIG. 4a. The jump distance is the same in FIGS. 4a and 4b.

An overview of the seven marking steps in FIG. 4b is shown in Table 2Table 1 below where the left column represents the marking steps 1-7, the middle column represents the start point of the marking step, i.e. the x direction, and the right column represents the end point of the marking step, i.e. the y direction. Y refers to a point on the y-axis, and x refers to a point on the x-axis. The −y refers to a downwards movement on the y-axis, +y refers to an upwards movement on the y-axis, −x refers to a left movement on the x-axis and +y refers to a right movement on the x-axis. 0 in the table refers to that there is no movement in the particular axis. The bold x and y in Table 2 illustrate a direction change, which will be described in more detail later.

TABLE 2

| Marking step | x direction | y direction |
| --- | --- | --- |
| 1 | 0 | −y |
| 2 | +x | 0 |
| 3 | 0 | +y |
| 4 | −x | −y |
| 5 | 0 | −y |
| 6 | +x | 0 |
| 7 | 0 | +y |

In addition to the differences between FIGS. 4a and 4b mentioned earlier, another difference between the non-optimal and the optimal or near optimal marking is the direction change that the printer 110 makes when marking the substrate. The marking in FIG. 4a comprises two 180 degree direction changes and FIG. 4b comprises one 180 degree direction change. The direction changes are illustrated with bold font in both Table 1 and Table 2. In FIG. 4a, the first direction change is between marking steps 5 and 6 where the change is from −x to +x, and the second direction change is between steps 6 and 7 from +y to −y. In FIG. 4b, the direction change is between steps 3 and 4 and is from +y to −y. Direction changes takes time and can negatively impact marking quality. Therefore, since the embodiments herein comprise a reduced number of direction changes, the marking quality and throughput is increased and improved.

FIG. 4c illustrates another example of the optimal or near optimal marking of the pattern 101 being exemplified by the letter H. This optimal or near optimal marking starts in the middle left corner of the letter H, which is a different start point compared to FIG. 4a and FIG. 4b. The marking then continues according to the numbered arrows in increasing order, starting with stroke 1, stroke 2, jump 3, stroke 4, stroke 5, jump 6 and ending with stroke 7. The optimized marking in FIG. 4c is performed in 7 steps, i.e. 5 strokes and 2 jumps, which is the same as in FIG. 4a and FIG. 4b. The jump distance is shorter than in FIGS. 4a and 4b, and there is no 180 degree direction change in the example illustrated in FIG. 4c.

An overview of the seven marking steps in FIG. 4c is shown in Table 3 below where the left column represents the marking steps 1-7, the middle column represents the start point of the marking step, i.e. the x direction, and the right column represents the end point of the marking step, i.e. the y direction. y refers to a point on the y-axis, and x refers to a point on the x-axis. The −y refers to a downwards movement on the y-axis, +y refers to an upwards movement on the y-axis, −x refers to a left movement on the x-axis and +y refers to a right movement on the x-axis.

TABLE 3

| Marking step | x direction | y direction |
| --- | --- | --- |
| 1 | +x | 0 |
| 2 | 0 | +y |
| 3 | −x | 0 |
| 4 | 0 | −y |
| 5 | 0 | −y |
| 6 | +x | 0 |
| 7 | 0 | +y |

Figure 5A:
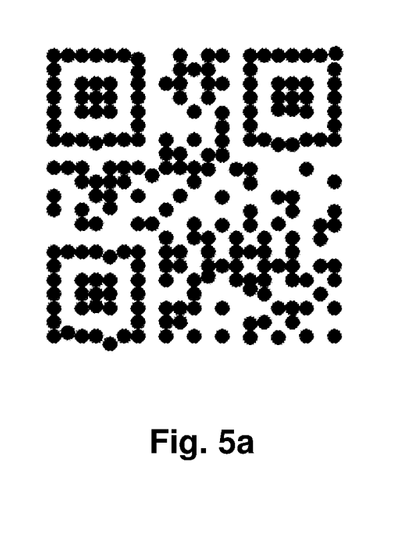
FIG. 5a is an example of a marking of a QR code in a non-optimal path.
Figure 5B:
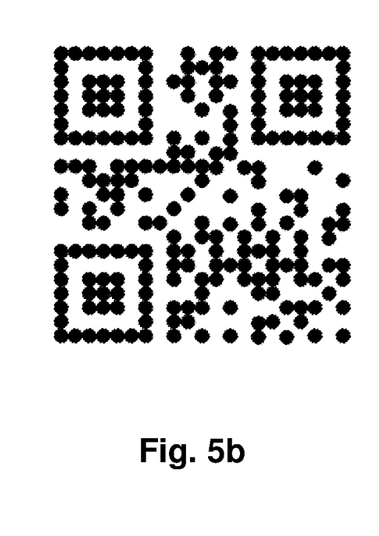
FIG. 5b is an example of a marking of a QR code in an optimal or near optimal path.

FIG. 5a illustrates an example of a QR code which has marked in a non-optimal path i.e. with misplaced dots, and FIG. 5b illustrates an example of the same QR code which has been marked in an optimal or near optimal path, i.e. with well-placed dots. The exact dot placement errors would be subject to the printer and the conditions. The QR code may also slant a bit with the ink jet technology as dots have to be fired in a sequence. With the genetic algorithm, the drop formation issues are minimized and the risk that the droplets get misplaced is also minimized. With the current technology, this may not be hand optimized since the print speed would have to be reduced. The genetic algorithm can minimize dot misplacement issues, particularly for marks where no efficient solution algorithm can be used.

Figure 6:
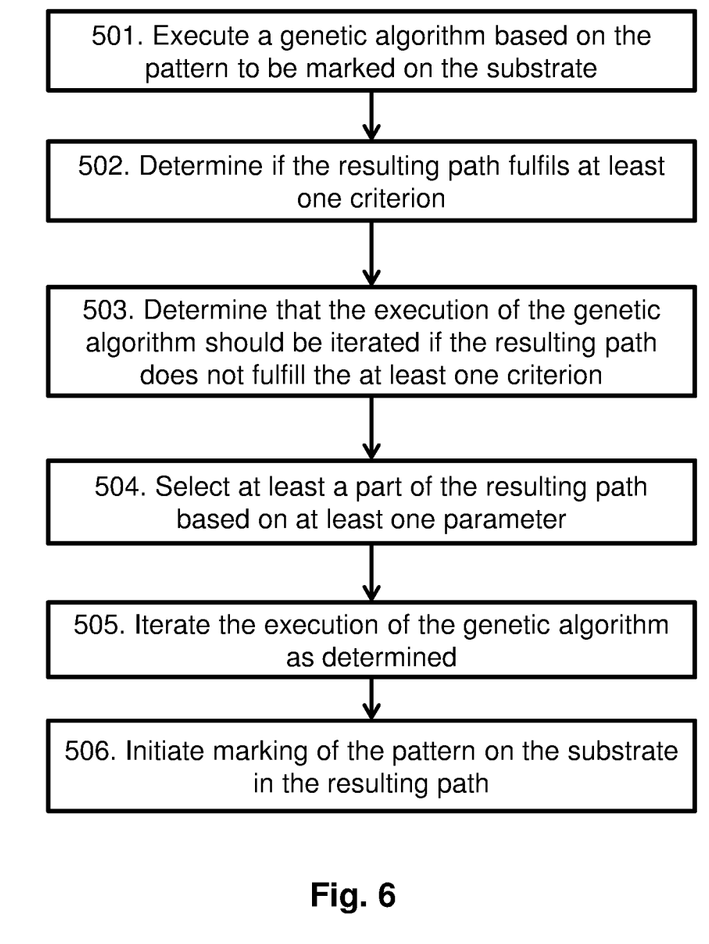
FIG. 6 is an example of a method.

FIG. 6 is a flowchart describing the present method for enabling marking of a pattern 101 on a substrate with an industrial printer 110. The method may be performed by a controller 118, and the controller 118 may be a standalone controller configured to communicate with the industrial printer 110, or the controller 118 may be embedded in the industrial printer 110. In both cases, the method may also be seen as being performed by the industrial printer 110, for example via the controller 118. The industrial printer 110 may be a laser printer or an ink jet printer. The ink jet printer may be a CIJ printer.

The method illustrated in FIG. 6 comprises at least one of the following steps, which steps may be performed in any suitable order than described below:

Step 501

This step corresponds to step 201 in FIGS. 2a and 2b. The controller 118 executes a genetic algorithm based on the pattern 101 to be marked on the substrate. A result of the genetic algorithm indicates a resulting path which the industrial printer 110 should follow when marking the pattern 101 on the substrate.

The resulting path may be an optimal path or a near optimal path.

The resulting path is associated with or comprises at least one of the following:

a minimal jump distance, and/or
a minimal number of mirror direction reversals,
and/or a minimal number of mirror speed changes, and/or
a minimum of retracing of an area that already has been marked, and/or
a minimal dot marking location deviation.

With an ink jet printer, the dot marking location deviation may be caused by substrate movement, drop charge attraction, aerodynamic effect. With a laser printer, the dot marking location deviation may be caused by galvo inertia, galvo control errors such as overshoot and undershoot.

The resulting path which should be followed when marking the pattern 101, i.e. the pattern that the industrial printer 110, e.g. the print head 115, should follow, may indicates at least one of:

an order in which parts which constitutes the pattern 101 should be marked by the industrial printer 110 in the resulting path, and/or
a direction in which the parts which constitutes the pattern 101 should be marked by the industrial printer 110, and/or
a deflection angle of the industrial printer 110.

The parts which constitute the pattern 101 may be at least one of: strokes and/or jumps and/or dots.

The pattern 101 to be marked may be a text, a graphic, a one or two dimensional code, an image, a line, a box or a circle, or any combination of this. For example, true type fonts or proprietary font formats may be used to describe how to mark glyphs in the text.

Step 502

This step corresponds to step 202 in FIGS. 2a and 2b. The controller 118 determines if the resulting path fulfils at least one criterion.

The criterion may be at least one of the following:
that the resulting path matches an optimal path for marking the pattern 101; and/or
that the resulting path substantially matches the optimal path; and/or
that a time spent for executing the genetic algorithm has reached or exceeded a threshold.

When the resulting path matches the optimal path, the resulting path may be referred to as a resulting optimal path or an optimal path. When the resulting path substantially matches the optimal path, the resulting path may be referred to as a resulting near optimal path or a near optimal path.

Step 503

This step corresponds to step 202 in FIGS. 2a and 2b. The controller 118 may determine that the execution of the genetic algorithm should be iterated if the resulting path does not fulfill the at least one criterion.

Step 504

This step corresponds to step 202 in FIG. 2a and FIG. 2b. The controller 118 may select at least a part of the resulting path based on at least one parameter.

The parameter to be used when selecting at least part of the resulting path may be associated with at least one of:
A size of the pattern 101, and/or
A conveyor speed or a range of conveyor speed of a packaging line on which the substrate is conveyed when the pattern 101 is marked, and/or
A distance from a print head 115 of the industrial printer 110 to the substrate, and/or
An ink type to be used by the industrial printer 110 when marking the pattern 101.

The size of the pattern 101 may be a length and width of the pattern 101. The conveyor speed may be measured in m/s. The range of the conveyor speed may be for example in the range of 0-15 m/s, 0.3-10 m/s, 0.3-3 m/s, it may be 0.3 m/s, 3 m/s etc., but any other ranges which are faster or slower than this example is also applicable. The conveyor speed may also be zero, i.e. stationary, for example in case of a laser printer. The distance between the print head 115 and the substrate may be measured in mm, cm, m, inches or feet. The distance may also be referred to as throwing distance. The distance may be for example 4 mm or ½ inch for an ink jet printer, but any other smaller or larger distance is also applicable. In another example, the distance between the print head 115 and the substrate, may be in the range between 8-13 mm, in the range of 8-10 mm, it may be 8 mm, 10 mm, 12.5 mm etc. The length of the printed pattern for an ink jet printer may be near unlimited with a repeating pattern, e.g. when it used to mark cables. The distance may be limited by the lens for a laser printer, e.g. up to 500 mm. The length of the printed pattern for a laser printer may be near unlimited. The ink type may be for example food-grade ink, thermochromic ink, washable ink, water-based and alcohol-based ink, anti-diversion ink, pigmented ink, fade-resistant ink etc. or any other suitable ink type Step 505

This step corresponds to step 202 in FIGS. 2a and 2b. The controller 118 may iterate the execution of the genetic algorithm as determined. The selected part may be re-used when iterating the genetic algorithm.

Step 506

This step corresponds to step 203 in FIGS. 2a and 2b. The controller 118 may initiate marking of the pattern 101 on the substrate in the resulting path.

The controller 118 is configured to:
Execute a genetic algorithm based on a pattern 101 to be marked on a substrate with an industrial printer 110. A result of the genetic algorithm indicates a path which the industrial printer 110 should follow when marking the pattern 101.

Determine if the resulting path fulfils at least one criterion.

The criterion may be at least one of the following:
that the resulting path matches an optimal path for marking the pattern; and/or
that the resulting path substantially matches the optimal path; and/or
that a time spent for executing the genetic algorithm has reached or exceeded a threshold.

The controller 118 may be further configured to:
determine that the execution of the genetic algorithm should be iterated if the resulting path does not fulfill the criterion;
select at least a part of the resulting path based on at least one parameter; and to
iterate the execution of the genetic algorithm as determined, wherein the selected part is re-used when iterating the genetic algorithm.

The controller 118 may be further configured to initiate marking of the pattern 101 on the substrate in the resulting path.

An optimal path comprises at least one of, or any combination of:
a minimal jump distance, and/or
a minimal number of mirror direction reversals, and/or
a minimal number of mirror speed changes, and/or
a minimum of retracing of an area that already has been marked, and/or
a minimal dot marking location deviation.

The resulting path which should be followed, e.g. by the industrial printer 110 or by the print head 115, when marking the pattern 101 indicates at least one of:
An order in which parts which constitutes the pattern 101 should be marked by the industrial printer 110 in the resulting path, and/or
A direction in which the parts which constitutes the pattern 101 should be marked by the industrial printer 110, and/or
A deflection angle of the industrial printer 110.

The parts which constitute the pattern 101 may be at least one of: strokes and/or jumps and/or dots, or any combination thereof.

The parameter to be used when selecting at least part of the resulting path may be associated with at least one of:
a size of the pattern 101, and/or
a conveyor speed or a range of conveyor speed of a packaging line on which the substrate is conveyed when the pattern 101 is marked, and/or
a distance from a print head 115 of the industrial printer 110 to the substrate, and/or
an ink type to be used by the industrial printer 110 when marking the pattern 101.

The pattern 101 to be marked may be a text, a graphic, a one or two dimensional code, an image, a line, a box or a circle, or any combination thereof. For example, true type fonts or proprietary font formats may be used to describe how to mark glyphs in the text.

The industrial printer 110 may be a laser printer or an ink jet printer. The ink jet printer may be a CIJ printer.

The controller 118 may be a standalone controller 118 configured to communicate with the industrial printer 110, or wherein the controller 118 is embedded in the industrial printer 110.

A computer program may comprise instructions which, when executed on at least one processor, cause the at least one processor to carry out at one of the method steps in at least one of FIGS. 2a, 2b and 5. A carrier may comprise the computer program, and the carrier is one of an electronic signal, optical signal, radio signal or computer readable storage medium.

The present mechanism for enabling marking of a pattern 101 on a substrate with an industrial printer 110 may be implemented through one or more processors, such as the controller 118 depicted in FIG. 1, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the controller 118. One such carrier may be in the form of a CD ROM disc. It is however feasible with other data carriers such as a memory stick. The computer program code can furthermore be provided as pure program code on a server and downloaded to the controller 118.

With the embodiments herein, for example when the industrial printer 110 is based on laser technology, true type fonts, proprietary font formats or other off-the-shelf fonts are supported. The number of strokes and jumps are optimized to an optimal or at least a near optimal point. There may be a regenerate/re-calculate alternative in a user interface associated with the industrial printer 110 in case the user of the printer 110 wants to regenerate or re-calculate the path for marking the pattern 101. The optimization may differ from printer to printer or between regenerations. The optimization is calculated in a short period of time compared to taking hours or days with brute force algorithms as in the prior art.

With the embodiments herein, for example when the industrial printer 110 is based on ink jet technology, it may not be required for a user of the industrial printer 110 to select an algorithm or there may be some auto generate/intelligence choice in the user interface associated with the industrial printer 110. The genetic algorithm is executed based on parameters such as e.g. job, marking distance, speed, ink type and a near optimal value is used. There may be a regenerate/re-calculate alternative in the user interface. The optimization may differ between regenerations of the genetic algorithm. The optimization may be calculated in a short period of time compared to hours or days with brute force algorithms as in the prior art.

Summarized, the method for enabling a pattern 101 to be marked on a substrate with an industrial printer 110 may comprise at least one of the following steps:
1. Initial setup of the genetic algorithm
2. Execute the genetic algorithm
3. Evaluate if at least one criterion has been met. If at least one criterion is met: mark the pattern 101.
4. New iteration using the genetic algorithm with the best fitting candidates with crossovers and mutations, i.e. a loop back to step 2.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method for enabling marking of a pattern on a substrate with an industrial printer, the method comprising:
executing a genetic algorithm based on the pattern to be marked on the substrate, wherein a result of the genetic algorithm indicates a resulting path which the industrial printer should follow when marking the pattern on the substrate; and
determining if the resulting path fulfills at least one criterion.

2. The method according to claim 1, wherein the criterion is at least one of the following:
the resulting path matches an optimal path for marking the pattern;
the resulting path substantially matches the optimal path; or
a time spent for executing the genetic algorithm has reached or exceeded a threshold.

3. The method according to claim 1, further comprising:
determining that the execution of the genetic algorithm should be iterated if the resulting path does not fulfill the at least one criterion;
selecting at least a part of the resulting path based on at least one parameter; and
iterating the execution of the genetic algorithm as determined, wherein the selected part is re-used when iterating the genetic algorithm,
wherein the parameter is at least one of: a size of the pattern, a conveyor speed or a range of conveyor speed of a packaging line on which the substrate is conveyed when the pattern is marked, a distance from a print head of the industrial printer to the substrate, or an ink type to be used by the industrial printer when marking the pattern.

4. The method according to claim 1, further comprising:
initiating the marking of the pattern on the substrate in the resulting path.

5. The method according to claim 1, wherein the resulting path is associated with at least one of: a minimal jump distance, a minimal number of mirror direction reversals, a minimal number of mirror speed changes, a minimum of retracing of an area that already has been marked, or a minimal dot marking location deviation.

6. The method according to claim 1, wherein the resulting path which should be followed when marking the pattern indicates at least one of:
an order in which parts which constitutes the pattern should be marked by the industrial printer in the resulting path,
a direction in which the parts which constitutes the pattern should be marked by the industrial printer, or
a deflection angle of the industrial printer,
wherein the parts which constitutes the pattern is at least one of: strokes, jumps, or dots.

7. The method according to claim 1, wherein the pattern to be marked is a text, a graphic, a one or two dimensional code, an image, a line, a box or a circle.

8. The method according to claim 1, wherein the industrial printer is a laser printer or an ink jet printer.

9. The method according to claim 1, wherein the method is performed by a controller, wherein the controller is a standalone controller configured to communicate with the industrial printer or the controller is embedded in the industrial printer.

10. A controller being configured to:
execute a genetic algorithm based on a pattern to be marked on a substrate with an industrial printer, wherein a result of the genetic algorithm indicates a resulting path which the industrial printer should follow when marking the pattern; and to
determine if the resulting path fulfills at least one criterion.

11. The controller according to claim 10, wherein the criterion is at least one of the following:
the resulting path matches an optimal path for marking the pattern;
the resulting path substantially matches the optimal path; or
a time spent for executing the genetic algorithm has reached or exceeded a threshold.

12. The controller according to claim 10, being further configured to:
determine that the execution of the genetic algorithm should be iterated if the resulting path does not fulfill the criterion;
select at least a part of the resulting path based on at least one parameter; and to
iterate the execution of the genetic algorithm as determined, wherein the selected part is re-used when iterating the genetic algorithm,
wherein the parameter to be used when selecting at least part of the resulting path is associated with at least one of: a size of the pattern, a conveyor speed or a range of conveyor speed of a packaging line on which the substrate is conveyed when the pattern is marked, a distance from a print head of the industrial printer to the substrate, or an ink type to be used by the industrial printer when marking the pattern.

13. The controller according to claim 10, being further configured to:
initiate marking of the pattern on the substrate in the resulting path.

14. The controller according to claim 10, wherein the resulting path comprises at least one of: a minimal jump distance, a minimal number of mirror direction reversals, a minimal number of mirror speed changes, a minimum of retracing of an area that already has been marked, or a minimal dot marking location deviation.

15. The controller according to claim 10, wherein the resulting path which should be followed when marking the pattern indicates at least one of:
an order in which parts which constitutes the pattern should be marked by the industrial printer in the resulting path,
a direction in which the parts which constitutes the pattern should be marked by the industrial printer, or
a deflection angle of the industrial printer,
wherein the parts which constitutes the pattern is at least one of: strokes, jumps, or dots.

16. The controller according to claim 10, wherein the pattern to be marked is a text, a graphic, a one or two dimensional code, an image, a lines, a box or a circle.

17. The controller according to claim 10, wherein an industrial printer is a laser printer or an ink jet printer.

18. The controller according to claim 10, wherein the controller is a standalone controller configured to communicate with the industrial printer, or the controller is embedded in the industrial printer.

19. A non-transitory computer-readable medium having programmed thereon instructions which, when executed on at least one processor, cause the at least one processor to carry out the method according to claim 1.

* * * * *

UNITED STATES PATENT AND TRADEMARK OFFICE
CERTIFICATE OF CORRECTION

PATENT NO. : 10,703,099 B1
APPLICATION NO. : 16/220282
DATED : July 7, 2020
INVENTOR(S) : Andrew Yohn and Mikael Palmén Page 1 of 1

It is certified that error appears in the above-identified patent and that said Letters Patent is hereby corrected as shown below:

On the Title Page

Item (72), Inventors:, "Lidome (SE)" should read -- Lindome (SE) --.

Signed and Sealed this
Eighth Day of September, 2020

Andrei Iancu
*Director of the United States Patent and Trademark Office*